United States Patent
Hagias et al.

(10) Patent No.: US 12,270,568 B2
(45) Date of Patent: Apr. 8, 2025

(54) MULTI-UNIT SUPPORT DUCT SYSTEM

(71) Applicant: Seeley International Pty Ltd, Lonsdale (AU)

(72) Inventors: Diamantis Dimitris Hagias, Lonsdale (AU); Robert William Gilbert, Lonsdale (AU); Patrick McCaffrey, Lonsdale (AU); Giles McDonald, Lonsdale (AU); Jack Arney, Lonsdale (AU)

(73) Assignee: Seeley International Pty Ltd, Lonsdale (AU)

( * ) Notice: Subject to any disclaimer, the term of this patent is extended or adjusted under 35 U.S.C. 154(b) by 229 days.

(21) Appl. No.: 17/742,330

(22) Filed: May 11, 2022

(65) Prior Publication Data
US 2022/0364764 A1    Nov. 17, 2022

Related U.S. Application Data

(60) Provisional application No. 63/188,594, filed on May 14, 2021.

(51) Int. Cl.
*F24F 13/32*     (2006.01)
*F24F 3/044*     (2006.01)
*F24F 13/02*     (2006.01)

(52) U.S. Cl.
CPC .............. *F24F 13/32* (2013.01); *F24F 3/044* (2013.01); *F24F 13/0272* (2013.01)

(58) Field of Classification Search
CPC ........ F24F 13/32; F24F 3/044; F24F 13/0272; F24F 3/065; F24F 1/68; Y02B 30/54
(Continued)

(56) References Cited

U.S. PATENT DOCUMENTS

| | | | |
|---|---|---|---|
| 7,937,963 B1* | 5/2011 | Semmes | F28B 9/00 62/304 |
| 8,360,834 B1* | 1/2013 | Semmes | F24F 13/24 454/242 |

(Continued)

FOREIGN PATENT DOCUMENTS

| | | |
|---|---|---|
| EP | 2837751 A2 | 2/2015 |
| ES | 2218969 | 11/2004 |

(Continued)

OTHER PUBLICATIONS

Industrial walkway work platform, retrieved from Internet on Jul. 4, 2023, published Apr. 23, 2008, https://www.alamy.com/stock-photo-industrial-walkway-work-platform-148060372.html.

(Continued)

*Primary Examiner* — Steve S Tanenbaum
(74) *Attorney, Agent, or Firm* — Koenig IP Works, PLLC; Katherine Koenig

(57) ABSTRACT

Multi-unit cooling systems and structures thereof for residential, commercial, or other buildings. In one embodiment, a support duct system comprises a support duct frame including a longitudinal axis and at least one mounting bracket support, each of the at least one mounting bracket support being movable relative to the longitudinal axis of the support duct frame; and at least one mounting bracket coupled to a corresponding one of the at least one mounting bracket support, each of the at least one mounting bracket being removably couplable to a corresponding cooling unit. Each of the cooling units is independently rotatable relative to the longitudinal axis of the support duct frame.

8 Claims, 15 Drawing Sheets

(58) Field of Classification Search
USPC .......................................................... 62/259.1
See application file for complete search history.

(56) References Cited

U.S. PATENT DOCUMENTS

| | | | |
|---|---|---|---|
| 11,261,604 B1 | 3/2022 | Green et al. | |
| 2014/0352342 A1 | 12/2014 | Magro | |
| 2019/0360719 A1* | 11/2019 | Garg | F24F 13/20 |
| 2020/0033012 A1* | 1/2020 | Nagashima | F24F 1/68 |
| 2020/0370782 A1* | 11/2020 | Tamboli | F24F 13/32 |
| 2020/0378694 A1* | 12/2020 | Chehade | F28F 9/266 |

FOREIGN PATENT DOCUMENTS

| | | | |
|---|---|---|---|
| JP | 2018132229 A | 8/2018 | |
| WO | 2016081974 A1 | 6/2016 | |

OTHER PUBLICATIONS

International Search Report and Written Opinion, issued in PCT/IB2023/054877 by the Australian Patent Office, dated Jul. 4, 2023 (12 pages).
MonkeyToe, retrieved from Internet on Jul. 4, 2023, using Wayback Machine, published by Dec. 22, 2019, http://web.archive.org/web/20191222215538/https://www.monkeytoe.com.au/wp-content/uploads/2019/07/5.jpg.
Permacold01, retrieved from Internet on Jul. 4, 2023, using Wayback Machine, published by May 14, 2019, http://web.archive.org/web/20190514222857/https://www.process-cooling.com/ext/resources/issues/2019/May/PC0519_ePublishing_Permacold01.jpg?1556910105.
Roof Access WA, retrieved from Internet on Jul. 4, 2023, using Wayback Machine, published by Mar. 5, 2022, http://web.archive.org/web/20220305003346/https://www.roofaccesswa.com.au/wp-content/uploads/2021/03/IMG_5670.jpg.

* cited by examiner

MULTI-UNIT SUPPORT DUCT SYSTEM

CROSS-REFERENCE TO RELATED APPLICATIONS

This application claims the benefit of U.S. Provisional Patent Application No. 63/188,594, filed May 14, 2021, which is incorporated by reference herein in its entirety.

GOVERNMENT RIGHTS STATEMENT

N/A.

FIELD

This disclosure relates to multi-unit cooling systems and structures thereof for residential, commercial, or other buildings.

BACKGROUND

Cooling systems such as swamp or evaporative cooler systems provide cool air to a building or structure by the evaporation of water in evaporative media within a cooling unit. Fresh, higher-temperature intake air is drawn into the cooling unit, in which the air passes through airflow channels within the evaporative media. Water flowing within the evaporative media is evaporated by the intake air, which reduces the temperature of air flowing through the evaporative media. This cooler air is then exhausted from the cooling unit through ductwork and into the building/structure. Thus, the lower-temperature exhaust air provides cooling to the building/structure.

Depending on the size and type of the building/structure, it may be necessary to install more than one cooling unit to adequately cool the building/structure. However, the cost of equipment, installation, and repair can be significantly increased when multiple cooling units are required. For example, each cooling unit may be individually installed and require separate maintenance and repair. Additionally, a building/structure may not have the roof or other surface area to accommodate multiple cooling units, at least at load-bearing locations. This may require the piecemeal installation of cooling units at different locations on or within the building/structure, which can lead to inefficient cooling and require complicated ductwork.

SUMMARY

Some embodiments advantageously provide multi-unit cooling systems and structures thereof for residential, commercial, or other buildings. In one embodiment, a support duct system comprises: a support duct frame including a longitudinal axis and at least one mounting bracket support, each of the at least one mounting bracket support being movable relative to the longitudinal axis of the support duct frame; and at least one mounting bracket coupled to a corresponding one of the at least one mounting bracket support, each of the at least one mounting bracket being removably couplable to a corresponding cooling unit.

In one aspect of the embodiment, the support duct system further comprises at least one longitudinal frame member extending at least substantially parallel to the longitudinal axis of the support duct frame, the at least one mounting bracket support being slidably coupled to the at least one longitudinal frame member.

In one aspect of the embodiment, the at least one longitudinal frame member includes two longitudinal frame members, the at least one mounting bracket support extending between the two longitudinal frame members.

In one aspect of the embodiment, the support duct system further comprises an air duct within the support duct frame, the air duct including at least one cooling unit inlet.

In one aspect of the embodiment, the support duct system further comprises a service component conduit and a control box in communication with the service component conduit.

In one aspect of the embodiment, the support duct frame is a first support duct frame, the support duct system further comprising a second support duct frame; the service component conduit is a first service component conduit of the first support duct frame; the support duct system further comprises a second service component conduit of the second support duct frame; and the first service component conduit is in communication with the second service component conduit.

In one aspect of the embodiment, the first support duct frame further includes a first end and a second end and the second support duct frame includes a first end and a second end; and the support duct system further comprises an air duct within the second support duct frame, the second end of the first support duct frame being connected to the first end of the second support duct frame such that the air duct within the first support duct frame is in fluid communication with an air duct within the second support duct frame.

In one embodiment, a multi-unit cooling system comprises: an enclosed support duct frame defining a first compartment and a second compartment, the first compartment and the second compartment being fluidly isolated from each other; at least one recirculated air cooling unit within the first compartment; at least one makeup air cooling unit within the second compartment; and an air duct in fluid communication with the at least one recirculated air cooling unit and the at least one makeup air cooling unit.

In one aspect of the embodiment, the air duct is subjacent to the first compartment and the second compartment.

In one aspect of the embodiment, the enclosed support duct frame further defines an air duct, the air duct being in fluid communication with the at least one recirculated air cooling unit and the at least one makeup air cooling unit.

In one aspect of the embodiment, the air duct includes: a supply air plenum; a recirculated air plenum; and at least one wall, the at least one wall separating the supply air plenum and the recirculated air plenum.

In one aspect of the embodiment, each of the at least one makeup air cooling unit includes an outlet, the outlet of each of the at least one makeup air cooling unit being in fluid communication with the supply air plenum; and each of the at least one recirculated air cooling unit having an outlet, the outlet of each of the at least one recirculated air cooling unit being in fluid communication with supply air plenum.

In one aspect of the embodiment, each of the at least one makeup air cooling unit includes an inlet, the inlet of each of the at least one makeup air cooling unit being in fluid communication with external air from a surrounding environment as a source of makeup intake air; and each of the at least one recirculated air cooling unit includes an inlet, the inlet of each of the at least one air cooling unit being fluidly isolated from the external air from the surrounding environment as the source of makeup intake air and being in fluid communication with the recirculated air plenum as a source of recirculated intake air.

In one aspect of the embodiment, the enclosed support duct frame includes a longitudinal axis, a plurality of mounting bracket supports being movable relative to the longitudinal axis of the enclosed support duct frame, and a plurality of mounting brackets coupled to the plurality of mounting bracket supports, each of the at least one recirculated air cooling unit and each of the at least one makeup air cooling unit being coupled to a corresponding one of the plurality of mounting brackets such that each of the at least one recirculated air cooling unit and each of the at least one makeup air cooling unit is independently rotatable relative to the enclosed support duct frame.

In one aspect of the embodiment, the at least one recirculated air cooling unit includes at least two recirculated air cooling units and the at least one makeup air cooling unit includes one makeup air cooling unit.

In one aspect of the embodiment, the enclosed support duct frame includes: a frame; and a plurality of panels coupled to the frame and at least one partition, the plurality of panels and the partition defining the first compartment and the second compartment.

In one embodiment, a method of installing a multi-unit support duct system comprises: installing a support duct frame at an installation location, the support duct frame including a longitudinal axis and the multi-unit support duct system including a plurality of cooling units rotatably coupled to the support duct frame, each of the plurality of cooling units being in a first configuration relative to the longitudinal axis of the support duct frame; and independently rotating each of the plurality of cooling units from the first configuration to a second configuration relative to the support duct frame.

In one aspect of the embodiment, each of the plurality of cooling units has a longitudinal axis and: the longitudinal axis of each of the plurality of cooling units is at least substantially parallel to the longitudinal axis of the support duct frame when the plurality of cooling units is in the first configuration relative to the support duct frame; and the longitudinal axis of each of the plurality of cooling units is offset from the longitudinal axis of the support duct frame when the plurality of cooling units is in the second configuration relative to the support duct frame.

In one aspect of the embodiment, the longitudinal axis of each of the plurality of cooling units is approximately 45° from the longitudinal axis of the support duct frame.

In one aspect of the embodiment, the method further comprises adjusting a length of each of a plurality of adjustable feet to level the support duct frame relative to the installation location, each of the plurality of adjustable feet including a first end coupled to the support duct frame and a second free end configured to contact a surface of the installation location.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
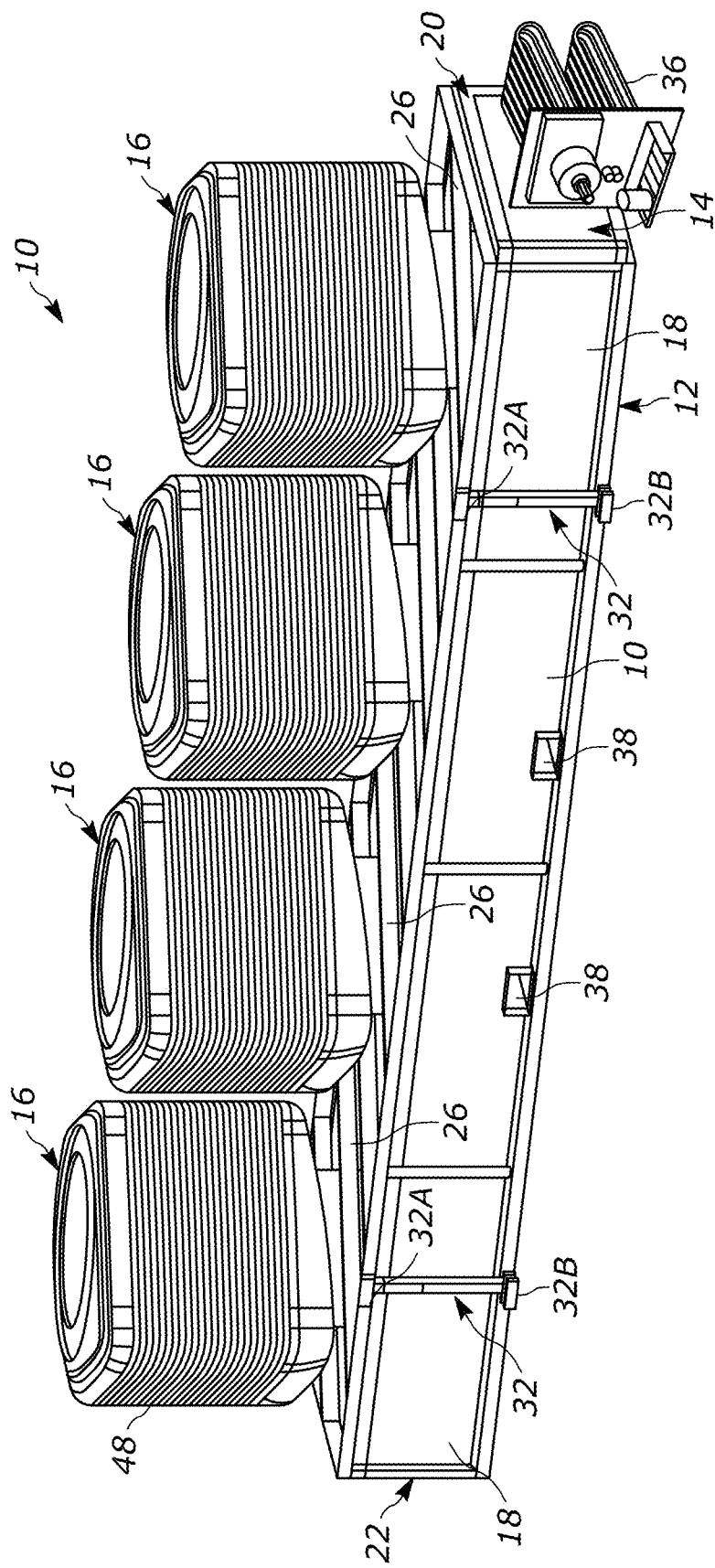
FIG. 1 shows a perspective view of a first embodiment of a multi-unit support duct system, in accordance with the present disclosure.

Before describing in detail exemplary embodiments, it is noted that the embodiments reside primarily in combinations of apparatus components and steps related to a multi-unit support duct system. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a," "an," and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
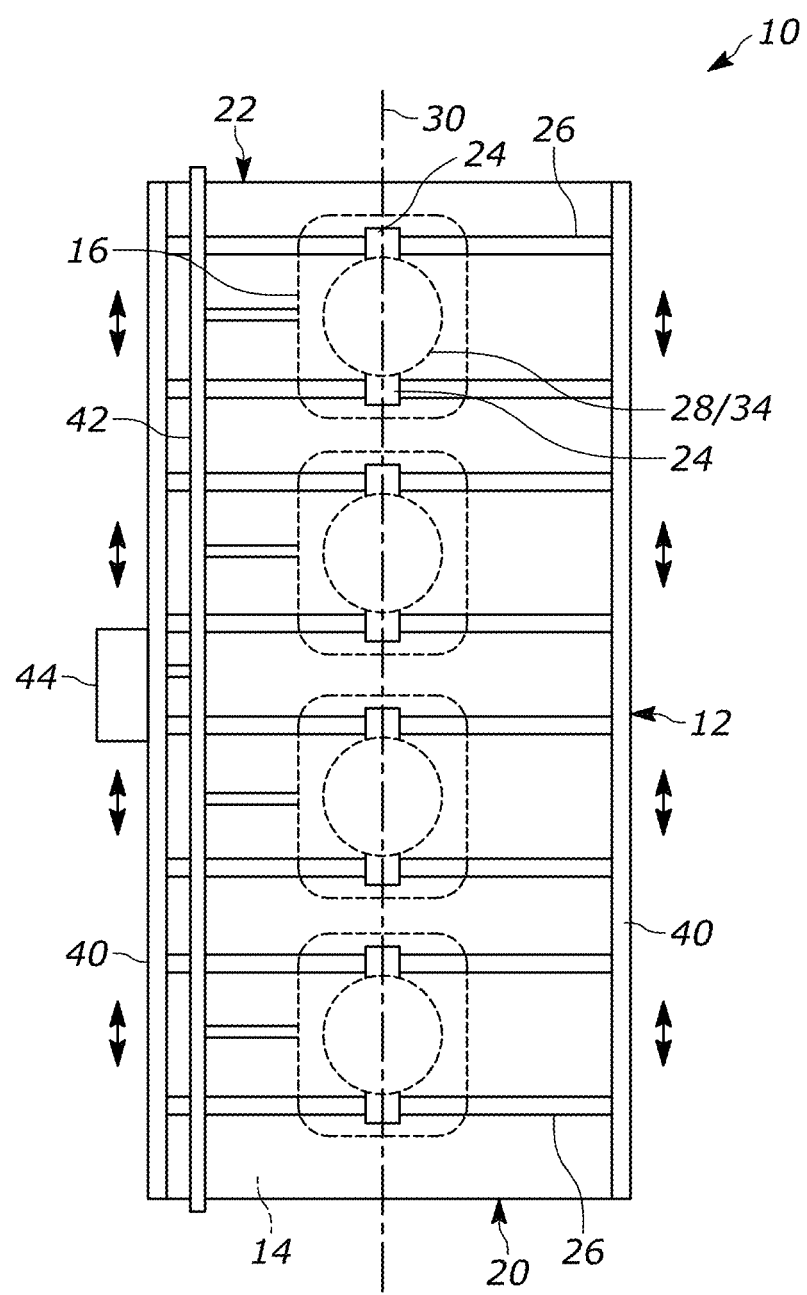
FIG. 2 shows a top view of a support duct frame of FIG. 1, in accordance with the present disclosure.
Figure 3:
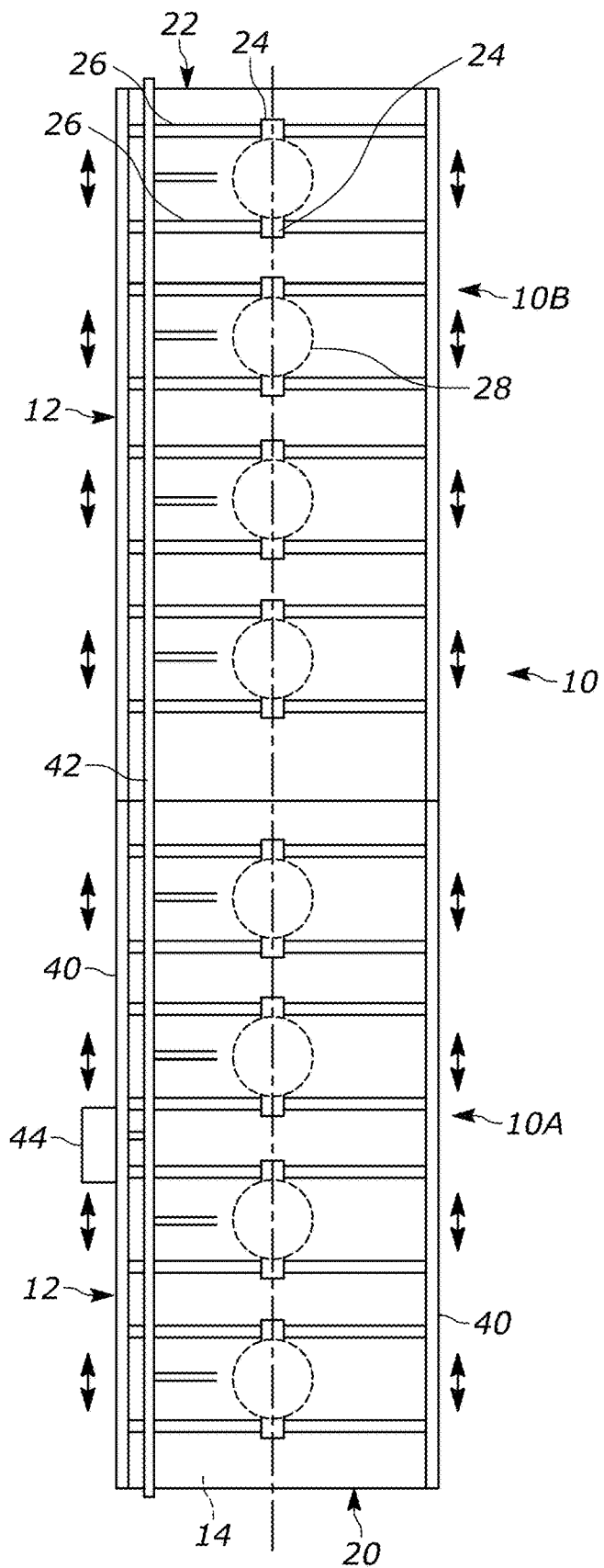
FIG. 3 shows a top view of multiple support duct frames of FIG. 2 connected in series and without cooling units (for ease of illustration), in accordance with the present disclosure.
Figure 4:
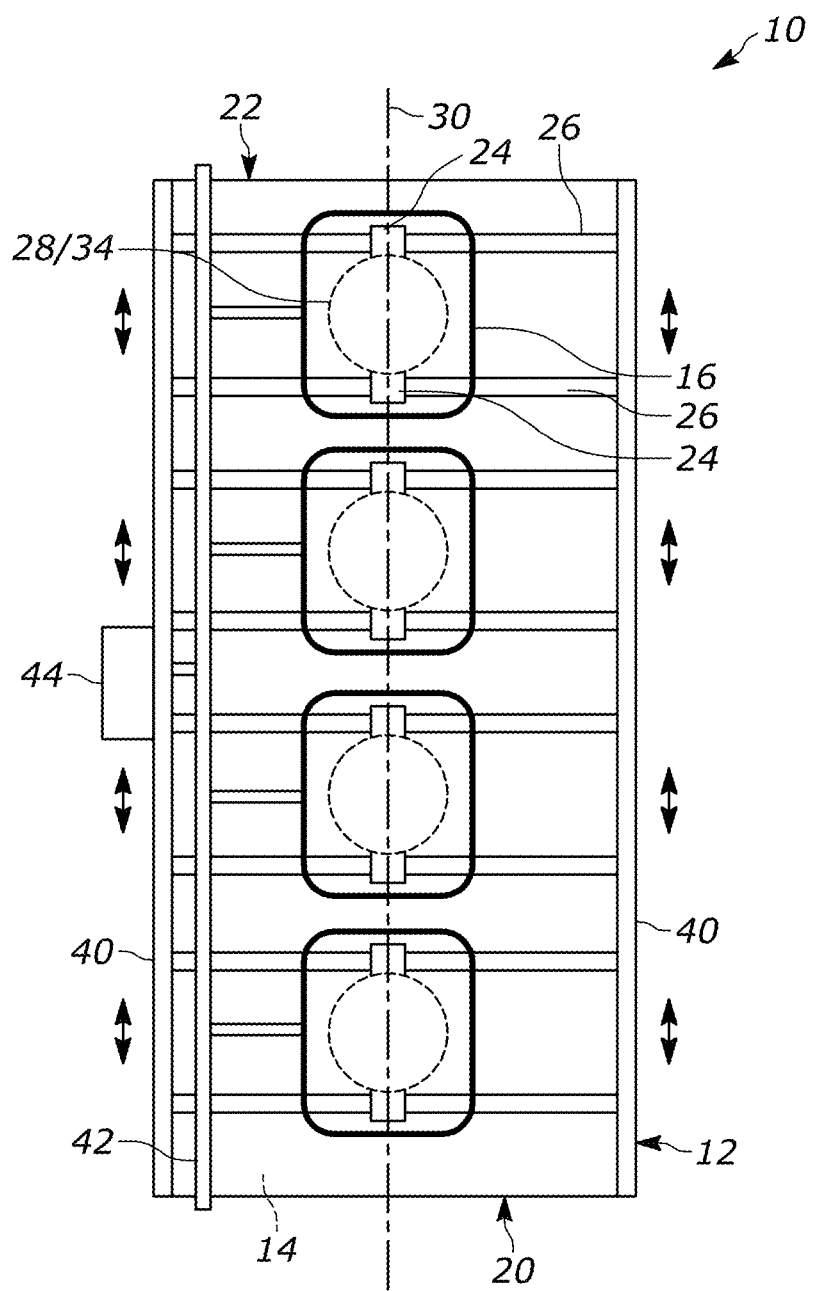
FIG. 4 shows a top view of the multi-unit support duct system of FIG. 1 in a delivery configuration, in accordance with the present disclosure.
Figure 5:
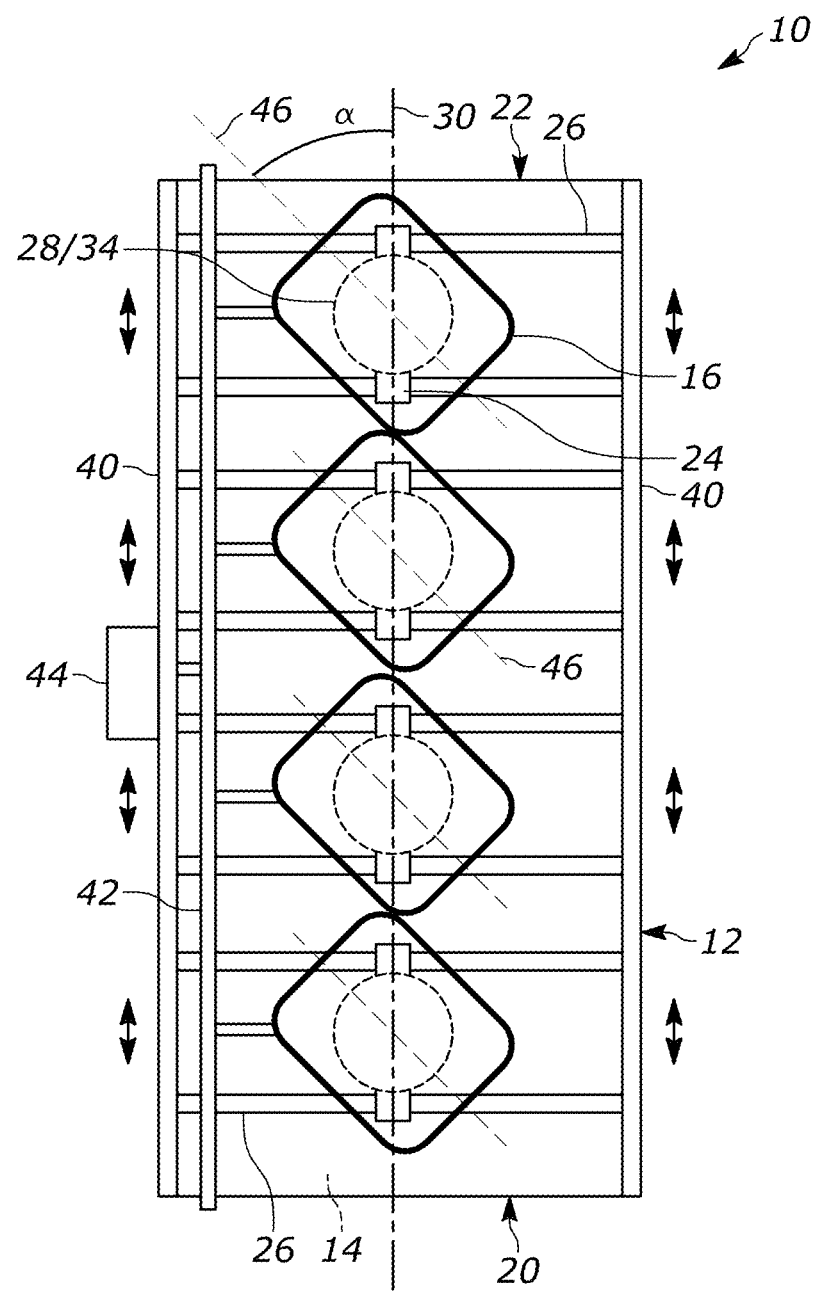
FIG. 5 shows a top view of the multi-unit support duct system of FIG. 1 in an operating configuration with a plurality of cooling units in a first exemplary rotational position, in accordance with the present disclosure.
Figure 6:
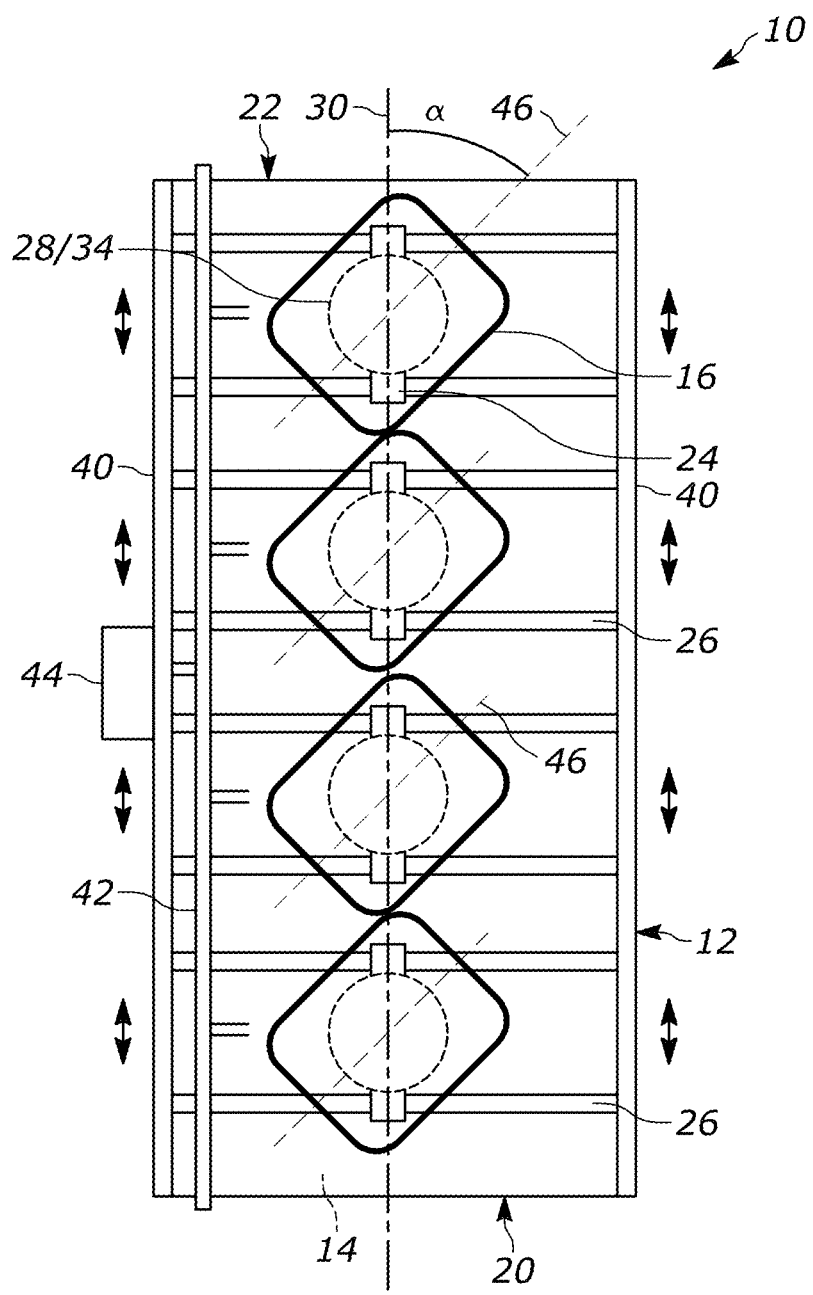
FIG. 6 shows a top view of the multi-unit support duct system of FIG. 1 in an operating configuration with a plurality of cooling units in a second exemplary rotational position, in accordance with the present disclosure.

Referring now to the figures in which like reference designators are used for like elements, a first embodiment of a multi-unit support duct system 10 is shown in FIGS. 1-6. FIG. 1 shows a multi-unit support duct system; FIG. 2 shows a support duct frame of the multi-unit support duct system (cooling units not shown for simplicity); FIG. 3 shows multiple support duct frames of FIG. 2 connected in series; FIG. 4 shows the multi-unit support duct system with cooling units in a delivery configuration; and FIGS. 5 and 6 show the multi-unit support duct system with cooling units in operating configurations.

Referring now to FIG. 1, a perspective view of a multi-unit support duct system 10 is shown. In one embodiment, the multi-unit support duct system 10 generally includes a support duct frame 12 defining, supporting, or otherwise including an air duct 14. The support duct frame 12 is configured such that it can span between load-bearing points of a building or structure and provide structural support for the air duct 14 and at least one cooling unit 16. Thus, the support duct frame 12 serves not only as an air duct 14 for a building or other structure, but also as a structural support for at least one cooling unit 16 that can extend between load bearing points of the building or structure. In some embodiments, the air duct 14 is a conduit that extends within the support duct frame 12. In some embodiments, the multi-unit support duct system 10 includes one or more panels 18 that are coupled to the support duct frame 12 to define the air duct 14. In one embodiment, the air duct 14 is defined on four sides by at least one first side panel, at least one second side panel, at least one lower or floor panel, and at least one upper or roof panel. The panels 18 may be integrated into a single conduit before placement within the support duct frame 12 (or may be otherwise manufactured as a single conduit) or may be individually installed into the support duct frame 12 to define the air duct 14. A first end 20 and/or a second end 22 of the air duct are open and in fluid communication with at least one supply duct or other conduits for delivering air to a space being cooled.

Continuing to refer to FIG. 1, and with reference to FIGS. 2-6, the multi-unit support duct system 10 also includes at least one cooling unit 16 that is removably coupled to the support duct frame 12. In one embodiment, the support duct frame 12 also includes a plurality of mounting brackets 24 each coupled to one or more of a plurality of mounting bracket supports 26, and each mounting bracket 24 is removably coupled or removably couplable to a corresponding cooling unit 16. As described in greater detail below, in one embodiment, each mounting bracket support 26 is slidably or movably coupled to the support duct frame 12 and each cooling unit 16 is removably and rotatably coupled to at least one mounting bracket 24 (not shown in FIG. 1). In one non-limiting example, as shown in FIGS. 2-6, each cooling unit 16 may be between and attached to or between two mounting bracket supports 26 and in communication with a cooling unit inlet 28 of the air duct 14. This allows each cooling unit 16 to be positioned at suitable weight-bearing locations on the support duct frame 12 and/or to be rotated relative to the longitudinal axis 30 of the support duct frame 12 to accommodate more than one cooling unit 16 along the support duct frame 12 and/or to maximize air flow into and through each cooling unit 16. It will be understood that the arrangement of mounting brackets 24 and/or mounting bracket supports 26 may have any suitable configuration, and is not limited to the horizontal configuration (or orthogonal to the support duct frame longitudinal axis 30) shown in FIGS. 2-6. For example, the mounting bracket supports 26 may be oriented diagonally (or at an angle from the support duct frame longitudinal axis 30), as shown in FIG. 1. Further, it will be understood that each cooling unit 16 may be attached to the support duct frame 12 in any suitable manner, including mounting configurations that allow the cooling unit(s) 16 to be movably and/or rotatably positioned on the support duct frame 12.

Continuing to refer to FIG. 1, in one embodiment, the multi-unit support duct system 10 also includes at least one adjustable foot 32 coupled to the support duct frame 12. Each adjustable foot 32 may be independently extendable between a range of lengths to suit a particular mounting location and to ensure the multi-unit support duct system 10 is properly leveled relative to the mounting surface or structure. Further, in some embodiments each adjustable foot 32 extends orthogonal to, or at least substantially orthogonal to, the longitudinal axis 30 of the support duct frame 12. Optionally, each adjustable foot 32 may also be pivotable or rotatable relative to the longitudinal axis 30 of the support duct frame 12. For example, each adjustable foot 32 may be telescoped with a button lock or cotter pin, spring mounted, rotatable about an attachment point, or have another suitable configuration. In one embodiment, a first end 32A of each adjustable foot 32 is removably coupled to the support duct frame 12 and a second end 32B of each adjustable foot 32 is a free end that is configured to engage with a mounting surface. In one embodiment, the first end 32A of each adjustable foot 32 is movable along at least a portion of the support duct frame 12, thereby allowing each adjustable foot 32 to be independently positioned at a location that is best for mounting the multi-unit support duct system 10 to the mounting surface or structure. In one embodiment, at least a portion of the free end 32B of each adjustable foot 32 is configured to stably rest on top of the mounting surface (such as a roof, floor, platform, or the like). In one embodiment, at least a portion of the free 32B end of each adjustable foot 32 is shaped and configured to be removably coupled to a mounting surface or structure (such as a railing, beam, joist, mounting frame, or the like). Further, in one embodiment the free end 32B of each adjustable foot 32 is attached to or includes a wheel, roller ball, or other device that allows the multi-unit support duct system 10 to be easily moved to an installation location. However, it will be understood that the multi-unit support duct system 10 is not limited to the adjustable feet 32 shown in FIG. 1, and may include a plurality of adjustable feet with a variety of free end types, and/or each adjustable foot 32 may have a free end that is configured to either rest on top of the mounting surface, to roll or slide across a surface, and/or be removably coupled to a mounting surface or structure.

Figure 14:
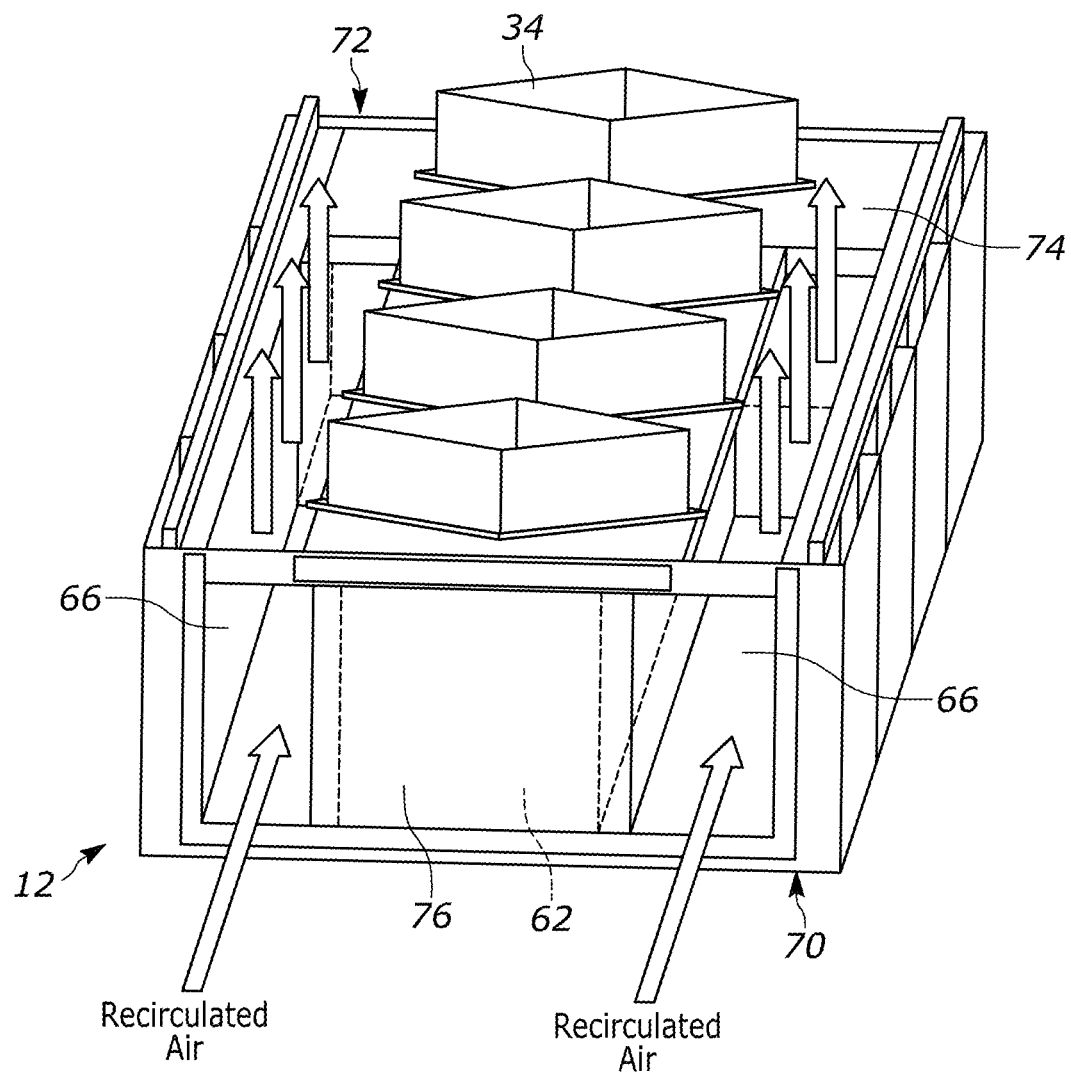
FIGS. 14 and 15 show perspective views of the multi-unit support duct system of FIG. 11, without cooling units and with airflow direction shown, in accordance with the present disclosure.
Figure 15:
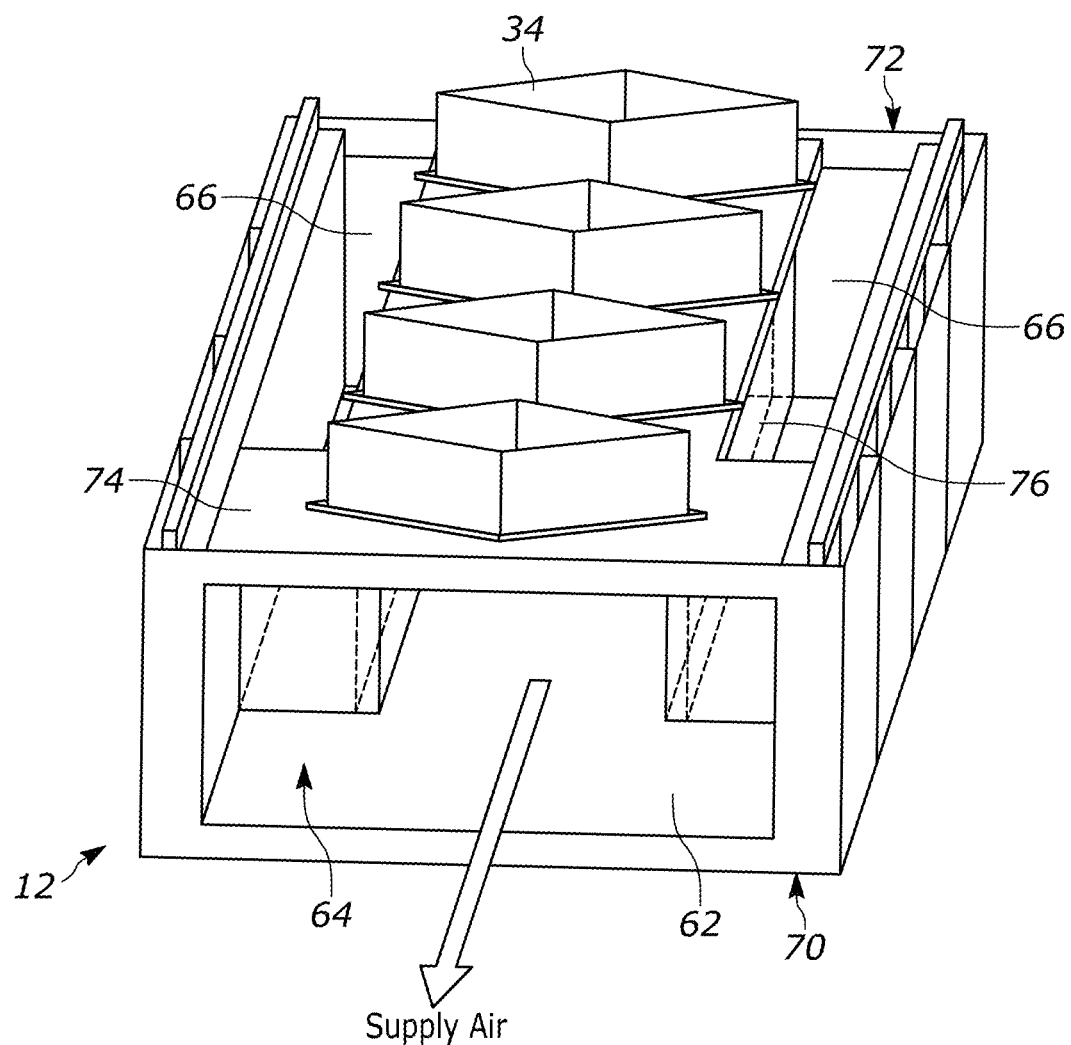

Continuing to refer to FIG. 1, and with reference to FIGS. 2-6, in one embodiment, the air duct 14 includes at least one cooling unit inlet 28 configured to be in fluid communication with an outlet 34 of a corresponding at least one cooling unit 16 (for example, as shown in FIGS. 14 and 15). In one embodiment, the air duct 14 includes a plurality of cooling unit inlets 28 at fixed positions along the air duct 14, each having a weather seal. Each cooling unit 16 is positioned over or proximate, and in fluid communication with, a corresponding one of the cooling unit inlets 28. The weather seal is opened or removed from each cooling unit inlet 28 over which a cooling unit 16 is positioned and any other cooling unit inlet 28 remains sealed to prevent the intake of air at unused locations. In another embodiment, the air duct 14 is formed within the support duct frame 12 to have cooling unit inlets 28 at each cooling unit location after the cooling unit(s) 16 are installed.

Continuing to refer to FIG. 1, in one embodiment the multi-unit support duct system 10 optionally includes a heater module 36 in communication with air flowing through the air duct 14. In one non-limiting example, the heater module 36 is a gas heater module that is positioned at or proximate an inlet (or first end 20) to the air duct 14 and configured to heat air entering the air duct 14 through the first end 20 and/or from the cooling unit(s) 16. In one embodiment, the multi-unit support duct system 10 also includes slots 38 to accept forklift tines for movement or transportation of at least the support duct frame 12.

Referring now to FIG. 2, a top view of the multi-unit support duct system 10 is shown, the cooling units shown with dashed lines so other components of the multi-unit support duct system 10 can be more clearly seen. The longitudinal axis 30 of the support duct frame 12 extends generally parallel to the direction of air flow through the air duct 14. Each mounting bracket support 26 is movably coupled to at least a portion of the support duct frame 12, such as to a longitudinal frame member 40 on either side of the air duct 14. As indicated by the double-headed arrows in FIG. 2, each mounting bracket support 26 is independently slidable or movable along the support duct frame 12 (for example, along each of the longitudinal frame members 40), which allows the cooling units 16, once mounted to the mounting brackets 24, to be positioned over hard points and/or weight bearing sections and to adjust spacing of the cooling units 16 depending on the number of cooling units 16 used and the size and/or configuration of each, as well as being aligned with the cooling unit inlets 28. Put another way, the multi-unit support duct system 10 of the present disclosure allows for the selective and precise placement of each cooling unit 16 to ensure installation safety and efficiently of the system's operation, regardless of the number, size, or type of cooling unit(s) used.

Referring now to FIGS. 2 and 3, the multi-unit support duct system 10 includes at least one service component, such as water, power, control wires, and/or drains. In one embodiment, the multi-unit support duct system 10 includes at least one service component conduit 42 within and/or external to the air duct 14 within which power cords, water, water lines, drains, control wires, or the like may extend between cooling units 16 and/or between a first end 20 and a second end 22 of the air duct 14 and/or support duct frame 12 (as shown in FIGS. 2 and 3). Further, in one embodiment the multi-unit support duct system 10 includes at least one control box 44 at which each service component and/or service component conduit 42 may terminate or have a connection element. Thus, service components for the entire multi-unit support duct system 10 may be accessed and/or operated by the user at a single control box 44, which facilitates operation and maintenance of the system.

Referring to FIG. 3, in some embodiments more than one multi-unit support duct system 10 may be joined together in series depending on the required cooling capacity and/or configuration of the structure or building being cooled. For example, a first multi-unit support duct system 10A may be connected to a second multi-unit support duct system 10B to collectively form a single multi-unit support duct system 10 (as shown in FIG. 3). In such a configuration, the service component conduits 42 of each multi-unit support duct system 10 may be connected to service component conduit(s) 42 of adjacent multi-unit support duct system(s) 10. In one non-limiting example, at least one support duct frame 12 may include at least one attachment element, such as a clamp, clip, pin, or other mechanism for physically coupling adjacent support duct frames 12 and for facilitating or allowing for coupling between adjacent support duct frames 12, air ducts 14, and/or service component conduits 42. Thus, service components may extend through a series of multi-unit support duct systems 10 and all may be accessible by a user at a single location, or at a few locations, such as at the control box 44 of a first multi-unit support duct system 10A, which allows for operation, maintenance, and repair of many multi-unit support duct systems as if they were a single multi-unit support duct system. This may reduce installation and maintenance cost and/or allow the multi-unit support duct system 10 to take up less space than larger conventional spoked coolers. It will also be understood that more than one multi-unit support duct system 10 may be connected in other configurations, such as side-by-side, radially, at right angles, or the like, and that the connection port(s) may be located and configured other than shown in FIGS. 2 and 3 to allow for such connections. Cooling units 16 are not shown in FIG. 3 for simplicity, but it will be understood that the service component conduits 42 are configured to place the cooling units 16 in electrical, fluid, and/or mechanical communication with each other and/or with at least one control box 44, as shown in FIG. 2.

Referring now to FIGS. 4-6, top views of a multi-unit support duct system 10 are shown with cooling units 16 attached. FIG. 4 shows a multi-unit support duct system 10 with a plurality of cooling units 16 aligned in an exemplary delivery configuration, FIG. 5 shows a multi-unit support duct system 10 with a plurality of cooling units 16 aligned in a first exemplary rotational position, and FIG. 6 shows a multi-unit support duct system 10 with a plurality of cooling units 16 aligned in a second exemplary rotational position. The first and/or second rotational positions shown in FIGS. 5 and 6 may be referred to as operational configurations. As the cooling unit inlet 28 and the outlet 34 of the air duct 14 are aligned, they are collectively referred to in FIGS. 2, 4, and 5 with reference number 28/34.

Referring to FIG. 4, an exemplary embodiment of a multi-unit support duct system 10 having four cooling units 16 is shown. However, any number of cooling units 16 may be used and the support duct frame 12 is sized accordingly. As discussed above, the mounting brackets 24 may be configured such that at least a portion of each is rotatable relative to the corresponding mounting bracket support 26 and about an axis that is orthogonal, or at least substantially orthogonal, to the longitudinal axis 30 of the support duct frame 12. In one embodiment, each mounting bracket 24 at least partially encircles or at least partially defines the outlet 34 of the cooling unit and/or the cooling unit inlet 28 of the air duct 14, with the entire mounting bracket 24 being rotatable relative to the support duct frame 12. Although FIG. 4, for example, shows two mounting brackets 24, it will be understood that one mounting bracket 24 may extend between two adjacent mounting bracket supports 26 such that each cooling unit 16 is mounted between adjacent mounting bracket supports 26 by one or more mounting brackets 24. Further, in one non-limiting example, each mounting bracket 24 is removably couplable to a corresponding cooling unit 16, such as to a lower surface of the cooling unit 16. For example, each cooling unit 16 may include a lower surface having a coupling element (such as a clamp, friction fit element, or coupling element configured to receive or engage with at least a portion of a mounting bracket) that is removably couplable to a mounting bracket 24.

Each cooling unit 16 may have a longitudinal axis 46 and, in a first configuration shown in FIG. 4, the longitudinal axis 46 of each cooling unit 16 is aligned or parallel, or at least substantially aligned or parallel, with (for example, within 0°±10° from) the longitudinal axis 30 of the support duct frame 12. In this configuration, the multi-unit support duct system 10 may be configured such that no part of the cooling units 16 extends beyond the sides of (that is, is wider than) the support duct frame 12. As this configuration may facilitate shipping, storage, and/or installation, it is referred to herein as the delivery configuration.

Referring to FIGS. 5 and 6, the exemplary embodiment of a multi-unit support duct system 10 having four cooling 16 units is shown. In the second configuration shown in FIGS. 5 and 6, the longitudinal axis 46 of each cooling unit 16 is offset from the longitudinal axis 30 of the support duct frame 12 by angle α. FIG. 5 shows the cooling units 16 rotated counterclockwise by a, approximately 45° (±10°) from 0° (or rotated clockwise by approximately 135°±10°) and FIG. 6 shows the cooling units rotated clockwise by a, approximately 45° (±10°) from 0° (or rotated counterclockwise by approximately 135°±10°). As discussed above, each cooling unit 16 is independently rotatable relative to the longitudinal axis 30 of the support duct frame 12 by the coupling between the cooling unit 16 and the corresponding mounting bracket 24 and, therefore, each cooling unit 16 may be rotated to a different angle relative to the longitudinal axis 30 of the support duct frame 12. In this configuration, each cooling unit 16 may present a larger surface area for the unimpeded inflow of air through the side panels of each cooling unit 16, while still conserving space to accommodate multiple cooling units 16 along the support duct frame 12. Additionally, this configuration may facilitate removal and replacement of filter(s) from each cooling unit 16. This configuration is referred to herein as the operating configuration. Although the cooling units 16 are shown in FIGS. 5 and 6 are each rotated to be offset from the longitudinal axis 30 of the support duct frame 12 by approximately the same amount (that is, the longitudinal axes 46 of the cooling units 16 are at least substantially parallel to each other but offset from the longitudinal axis 30 of the support duct frame 12), it will be understood that each cooling unit 16 is rotatable independently of the others and, therefore, each cooling unit 16 may be aligned with or offset by any angle relative to the longitudinal axis 30 of the support duct frame 12. For example, in the second configuration, each of the cooling units 16 may be rotated clockwise or counterclockwise by 45°. In other examples, in the second configuration, each of the cooling units 16 may be rotated clockwise or counterclockwise by α, such as approximately 45° (±10°), by approximately 35° (±) 10°, by approximately 25° (±10°), or approximately 15° (±10°). In other examples, each cooling unit 16 is rotated clockwise or counterclockwise by any amount relative to 0°, regardless of the rotational position of the other cooling units 16.

When the multi-unit support duct system 10 is installed, each cooling unit 16 is exposed to external air in the surrounding environment and is in fluid communication with a corresponding cooling unit inlet 28 of the air duct 14. Thus, when the cooling unit(s) 16 are in operation, external air is drawn into the cooling unit(s) directly through louvered lids or covers (housing) 48 of each cooling unit 16, cooled by passing through evaporative media within the cooling units 16, and then passes into the air duct 14 through the cooling unit inlet(s) 28. The cooled cooling air passes through the air duct 14 and into the space being cooled (such as a building or structure in which the multi-unit support duct system 10 is installed). However, in some embodiments, the cooling unit(s) 16 may be contained within a common housing and external air may be drawn into the common housing and then into the lids or covers of each cooling unit 16.

Figure 7:
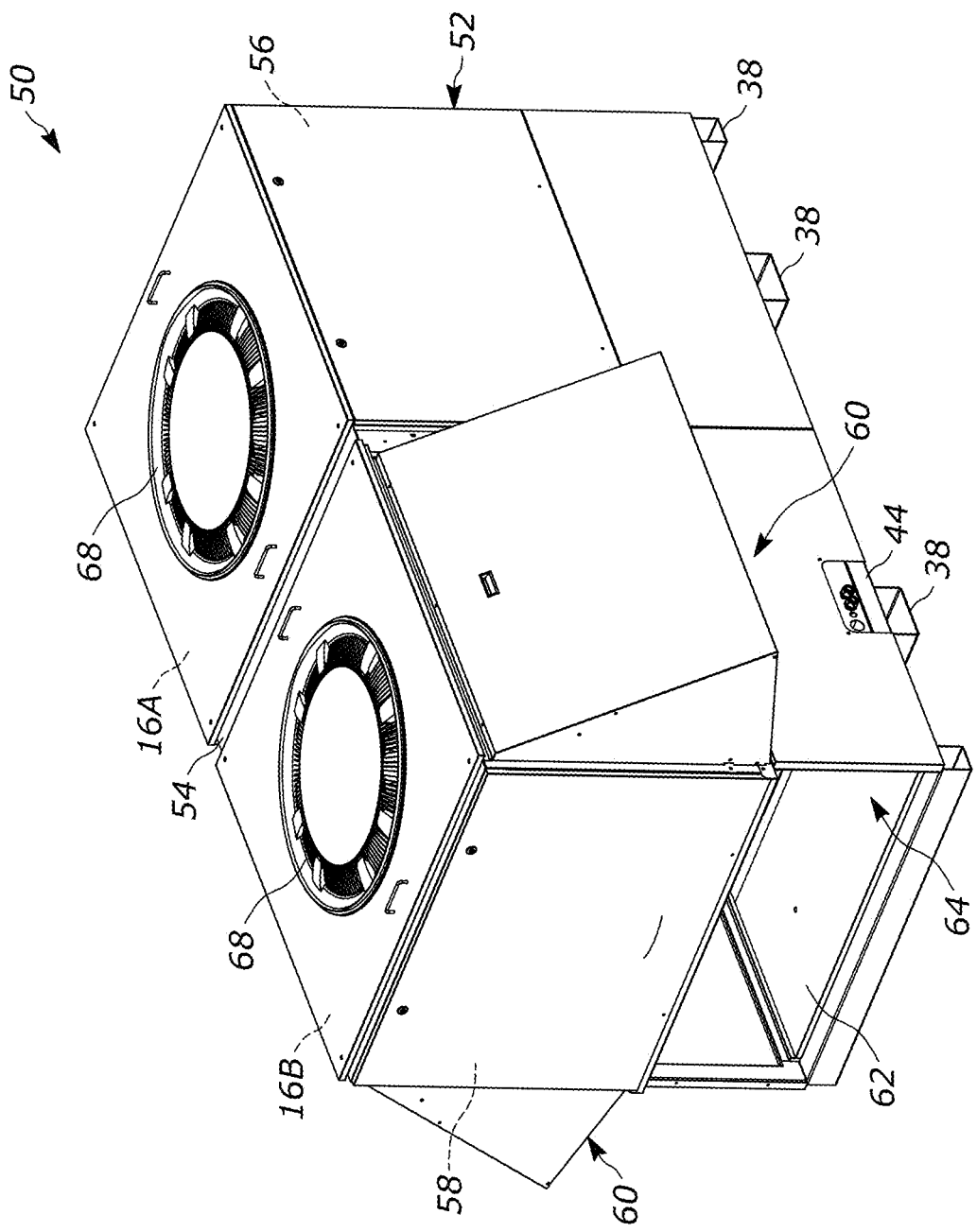
FIG. 7 shows a perspective view of a second embodiment of a multi-unit support duct system, in accordance with the present disclosure.
Figure 8:
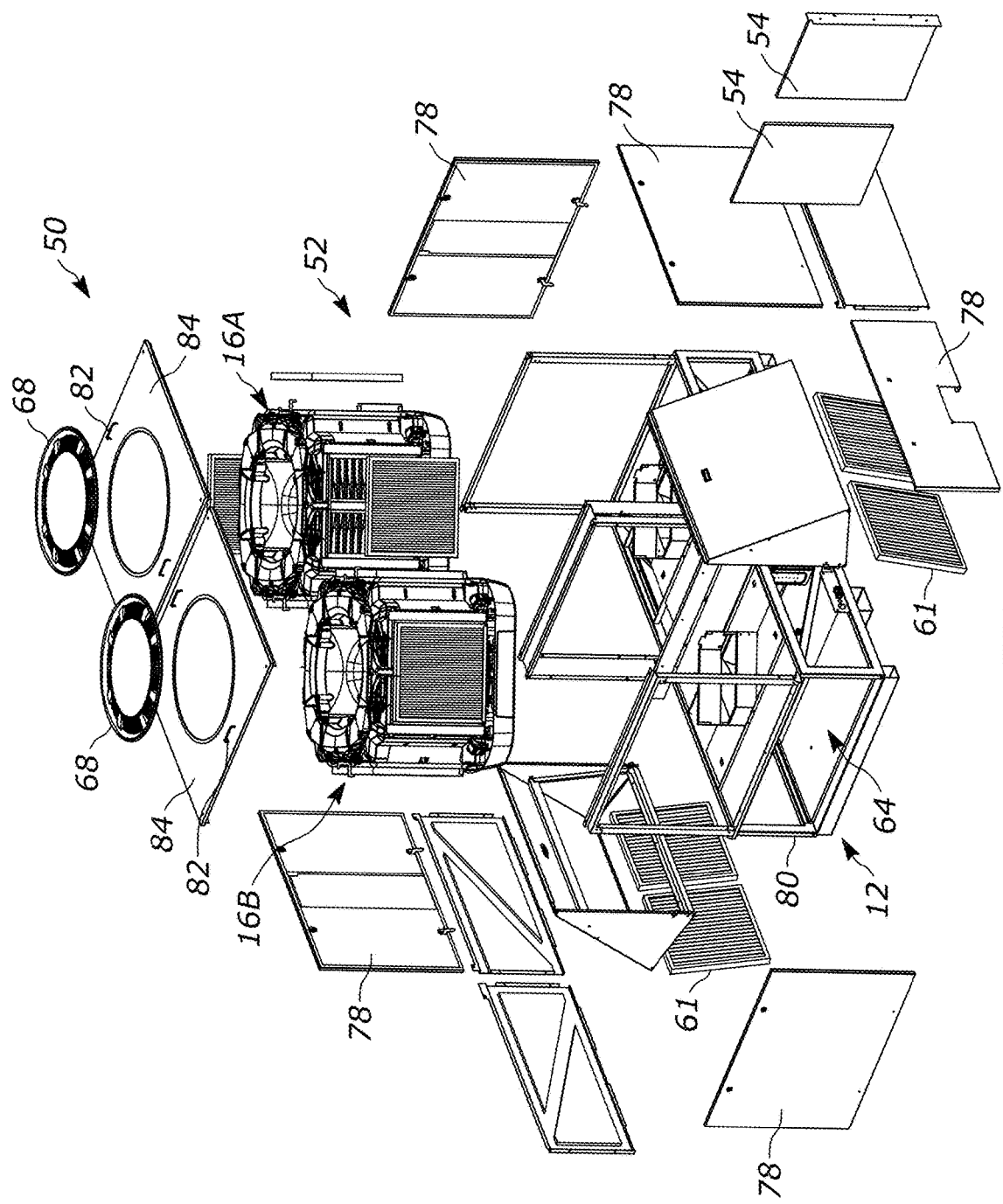
FIG. 8 shows an exploded view of the second embodiment of the multi-unit support duct system of FIG. 7, in accordance with the present disclosure.
Figure 9:
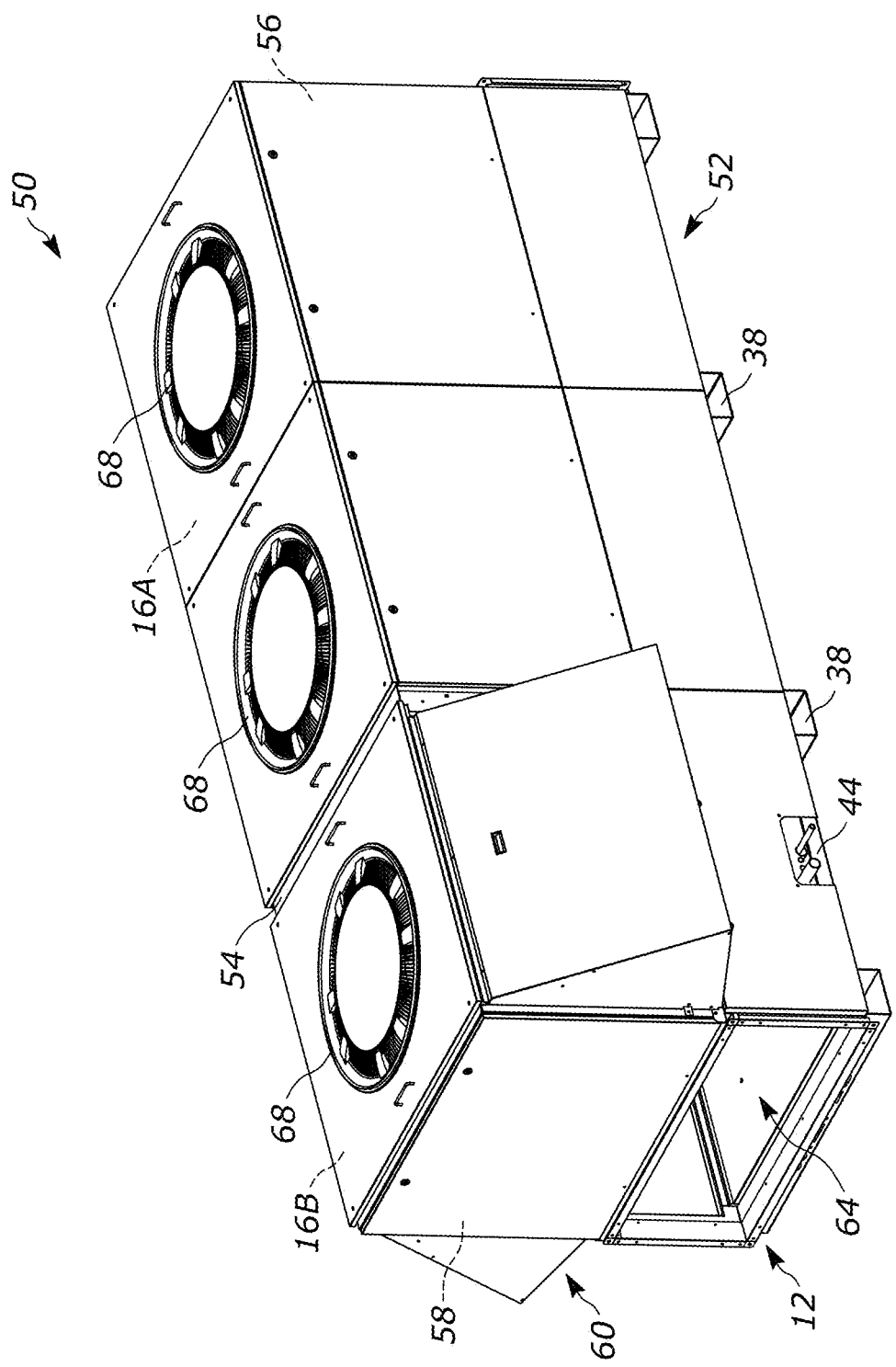
FIG. 9 shows a perspective view of a third embodiment of a multi-unit support duct system, in accordance with the present disclosure.

Referring now to FIGS. 7-15, a second, a third, and a fourth embodiment of a multi-unit support duct system 50 are shown. FIGS. 7 and 8 show a second embodiment having two cooling units; FIG. 9 shows a third embodiment having three cooling units; and FIGS. 11, 12, 14, and 15 show a fourth embodiment having four cooling units. Unless otherwise noted, the components of the multi-unit support duct systems 50 of FIGS. 7-15 are as in the first embodiment of the multi-unit support duct system 10 described above and shown in FIGS. 1-6, as indicated by common reference numbers. Further, unless otherwise noted, the embodiments of the multi-unit support duct systems of FIGS. 7-15 are substantially the same as each other, except for the number of cooling units. It will further be understood that any number of cooling units may be used, and the number is not limited to those embodiments shown and described herein. Further, it will be understood that any number of multi-unit support duct systems 15 may be connected in series, such as shown and described in FIG. 3. Unlike the first embodiment shown in FIGS. 1-6, however, at least a portion of each of the embodiments of the multi-unit support duct system 50 shown in FIGS. 7-15 is sealed such that it is configured to recirculate at least a portion of air previously delivered to a space (such as a room or building) being cooled. Put another way, the multi-unit support duct system 50 of the second configuration is sealed such that no air escapes the multi-unit support duct system 50 unless the air first passes through the evaporation system within at least one cooling unit 16.

Figure 10:
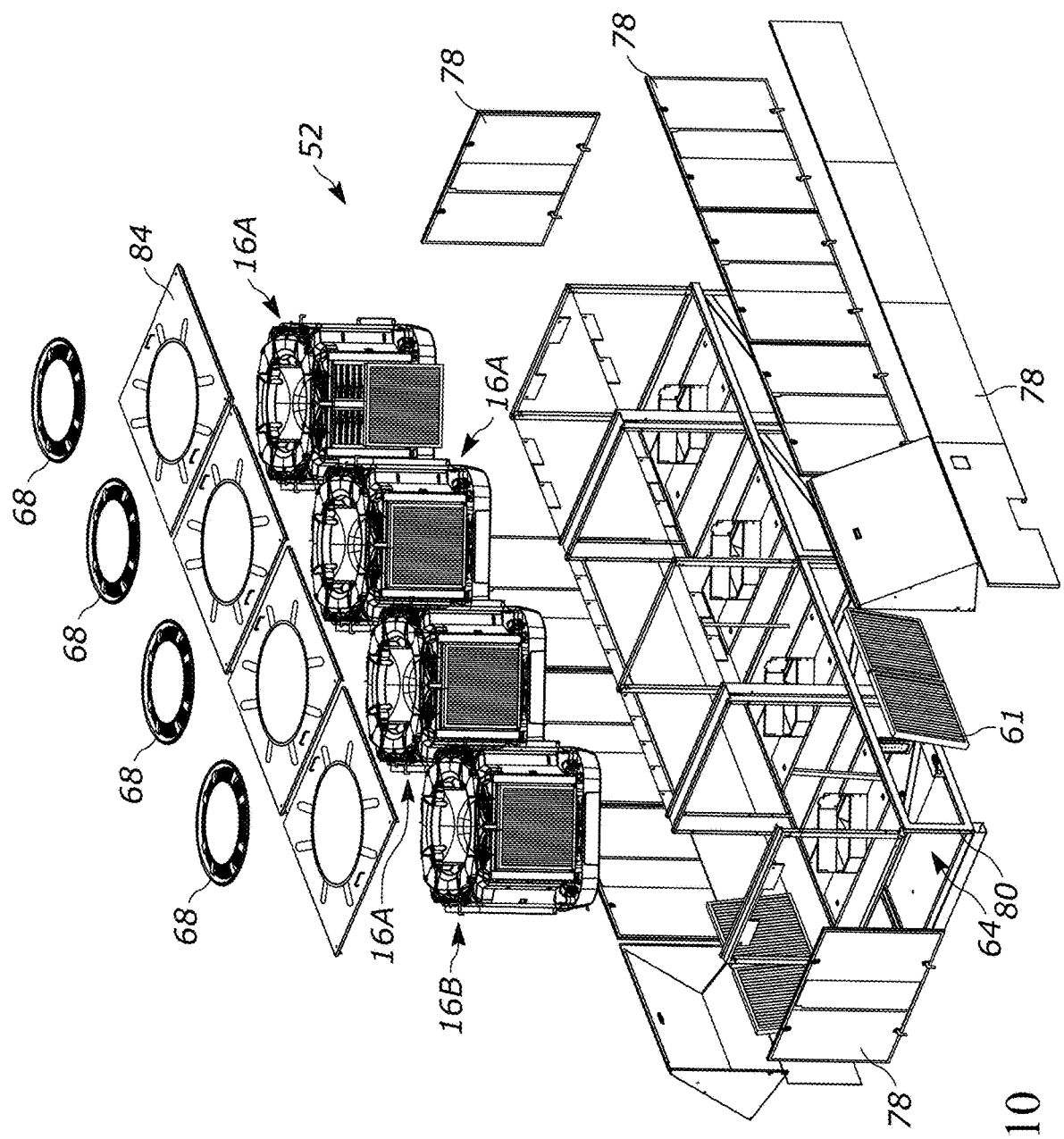
FIG. 10 shows an exploded view of a fourth embodiment of a multi-unit support duct system, in accordance with the present disclosure.
Figure 11:
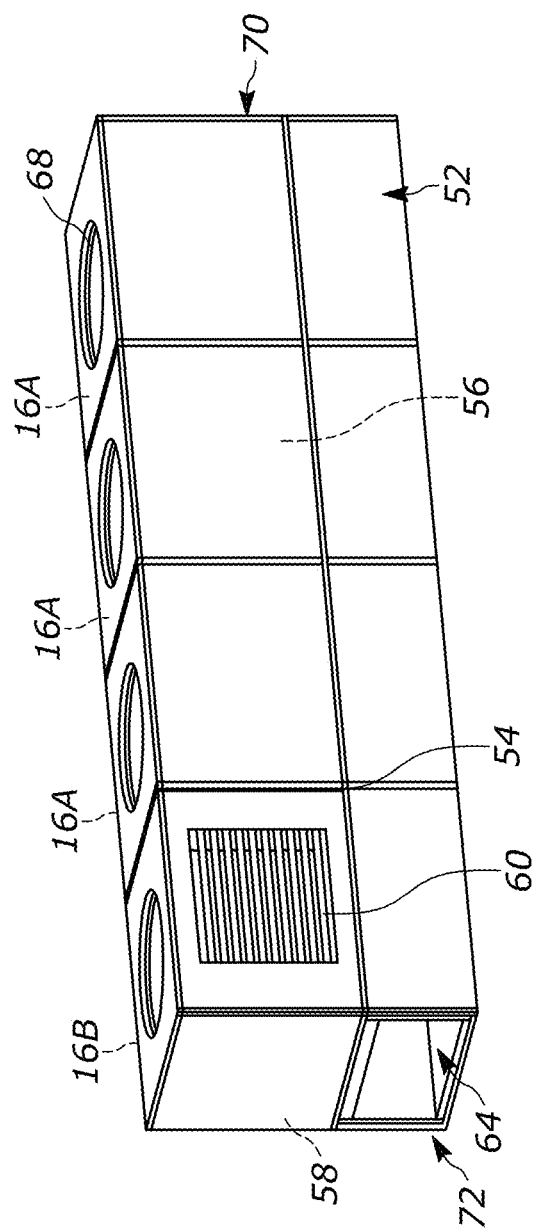
FIG. 11 shows a perspective view of the fourth embodiment of a multi-unit support duct system of FIG. 10, in accordance with the present disclosure.
Figure 12:
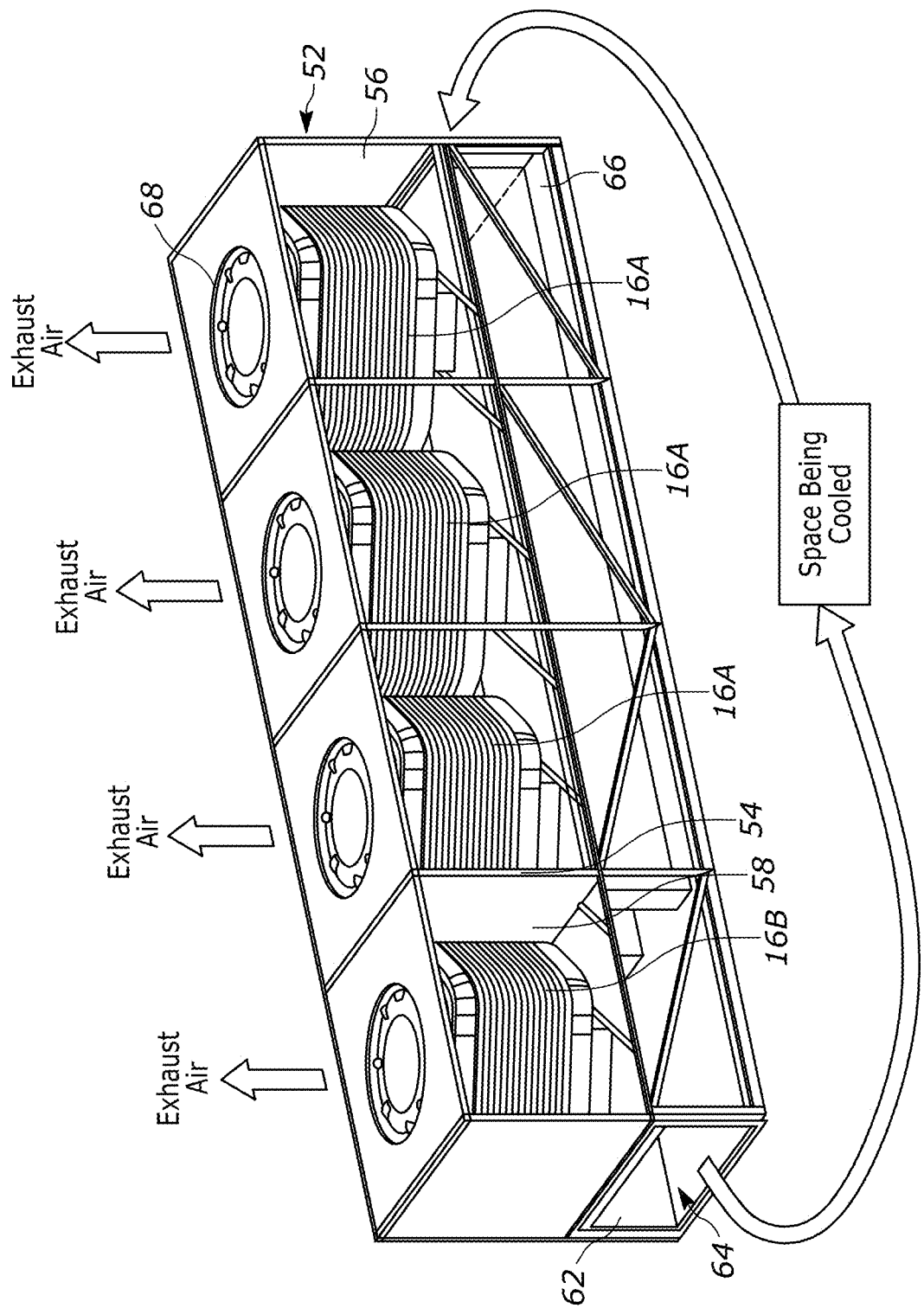
FIG. 12 show a perspective view of the multi-unit support duct system of FIG. 11 with side panels removed for illustration of certain internal components, in accordance with the present disclosure.

Referring now to FIGS. 7-15, the second, third, and fourth embodiments of the multi-unit support duct system 50, or multi-unit cooling system 50, is shown. In each embodiment, the multi-unit support duct system 50 includes a plurality of cooling units 16, with fewer than all cooling units 16 drawing in external air from the surrounding environment. In the non-limiting example shown in FIGS. 7 and 8, the multi-unit support duct system 50 includes two cooling units 16 within a cover 52. In the non-limiting example shown in FIG. 9, the multi-unit support duct system 50 includes three cooling units 16 within a cover 52. In the non-limiting example shown in FIGS. 11, 12, 14, and 15, the multi-unit support duct system 50 includes four cooling units 16 within a cover 52. In some embodiments, the In these non-limiting examples, the cover 52 includes a partition 54 that at least partially defines a first compartment 56 in which at least one cooling unit 16A (referred to herein as the recirculated air cooling unit(s) 16A) is located and at least partially defines a second compartment 58 in which at least one cooling unit 16B (referred to herein as the makeup air cooling unit(s) 16B) is located, which is best shown in FIG. 12. In one embodiment, the In one non-limiting example, the multi-unit support duct system 50 includes one recirculated air cooling unit 16A and one makeup air cooling unit 16B (as shown in FIGS. 7 and 8); in one non-limiting example, the multi-unit support duct system 50 includes two recirculated air cooling units 16A and one makeup air cooling unit 16B (as shown in FIG. 9); in one non-limiting example, the multi-unit support duct system 50 includes three recirculated air cooling units 16A and one makeup air cooling unit 16B (as shown in FIGS. 10-12). However, it will be understood that any number of recirculated air cooling units and makeup air cooling units may be used.

Continuing to refer to FIGS. 7-15, as air circulates between the space being cooled and the multi-unit support duct system 50, the recirculated air from the space being cooled is drawn into the first compartment 56 and into the recirculated air cooling units 16A (for example, into an inlet of each of the recirculated air cooling units 16A) but is fluidly isolated from the makeup air cooling unit 16B. In one embodiment (for example, as shown in FIG. 11), at least a portion of the cover 52 is louvered or otherwise includes openings 60 to provide external air to the second compartment 58 and the makeup air cooling unit 16B. In another embodiment (for example, as shown in FIGS. 7-9), at least a portion of the cover 52 forms a hood with an opening 60 and one or more filters 61 therein through which external air to the second compartment 58 is provided. That is, in one embodiment the cover 52 is configured such that external air (air from the surrounding environment), also referred to herein as makeup air, is drawn through the opening(s) 60 and into the second compartment 58, and then into the makeup air cooling unit 16B (for example, into an inlet of the makeup air cooling unit 16B, such as through the housing 48), by the makeup air cooling unit 16B, but is not drawn into the first compartment 56 and/or into the recirculated air cooling units 16A. As is discussed in greater detail below, the makeup air is cooled by the makeup air cooling unit 16B and discharged (for example, from an outlet 34 of the makeup air cooling unit 16B) into a supply air plenum 62 within the air duct 64 and then passed into the space being cooled. Recirculated air is drawn from the space being cooled and into a recirculated air plenum 66 within the air duct 64, from where the recirculated air is drawn into the recirculated air cooling unit(s) 16A, but not into the makeup air cooling unit 16B. In some embodiments, the air duct 64 is below or subjacent to the first and second compartments 56, 58 when the multi-unit cooling system 50 is in use. Recirculated air is then further cooled within the recirculated air cooling unit(s) 16A and discharged (for example, from an outlet 34 of each of the recirculated air cooling unit(s) 16A) into the supply air plenum 62 and mixed with the supply air discharged from the makeup air cooling unit 16B. In one embodiment, the cover 52 further includes at least one exhaust outlet 68 permitting exhaust air from the cooling unit(s) 16A, 16B to exit the multi-unit support duct system 50 and pass into the surrounding environment.

Continuing to refer to FIGS. 7-15, recirculating a portion of air from the space being cooled reduces cost and maintenance requirements, while increasing cooling efficiency without added humidity. In one non-limiting example meant to illustrate possible temperature and volume contributions of the cooling units, the multi-unit support duct system 50 includes three recirculated air cooling units 16A (as shown in FIGS. 10-12) that together provide approximately 4500 L/s of cooled air at approximately 19° C. (±3° C.) and one makeup air cooling unit 16B that provides approximately 1500 L/s of cooled air at 25° C. (±3° C.). Once cooled air from the recirculated air cooling unit(s) 16A and the makeup air cooling unit 16B is mixed within the supply air plenum 62, the combined supply air is provided at approximately 6000 L/s at approximately 21° C. (±3° C.). This multi-unit support duct system 50 reduces the amount of water needed to wet the evaporative media (to maintain cooling efficiency) by about 50%, provides 47 kW of cooling, and reduces filter replacement cost by about 70% while still introducing about 25% fresh air into the system without added humidity. However, it will be understood that the multi-unit support duct system 50 may include any suitable number of recirculated air cooling units 16A and any suitable number of makeup air cooling units 16B (that is, not limited to one makeup air cooling unit 16B), depending on the required output of the multi-unit support duct system 50, size of the space being cooled, or the like.

Figure 13:
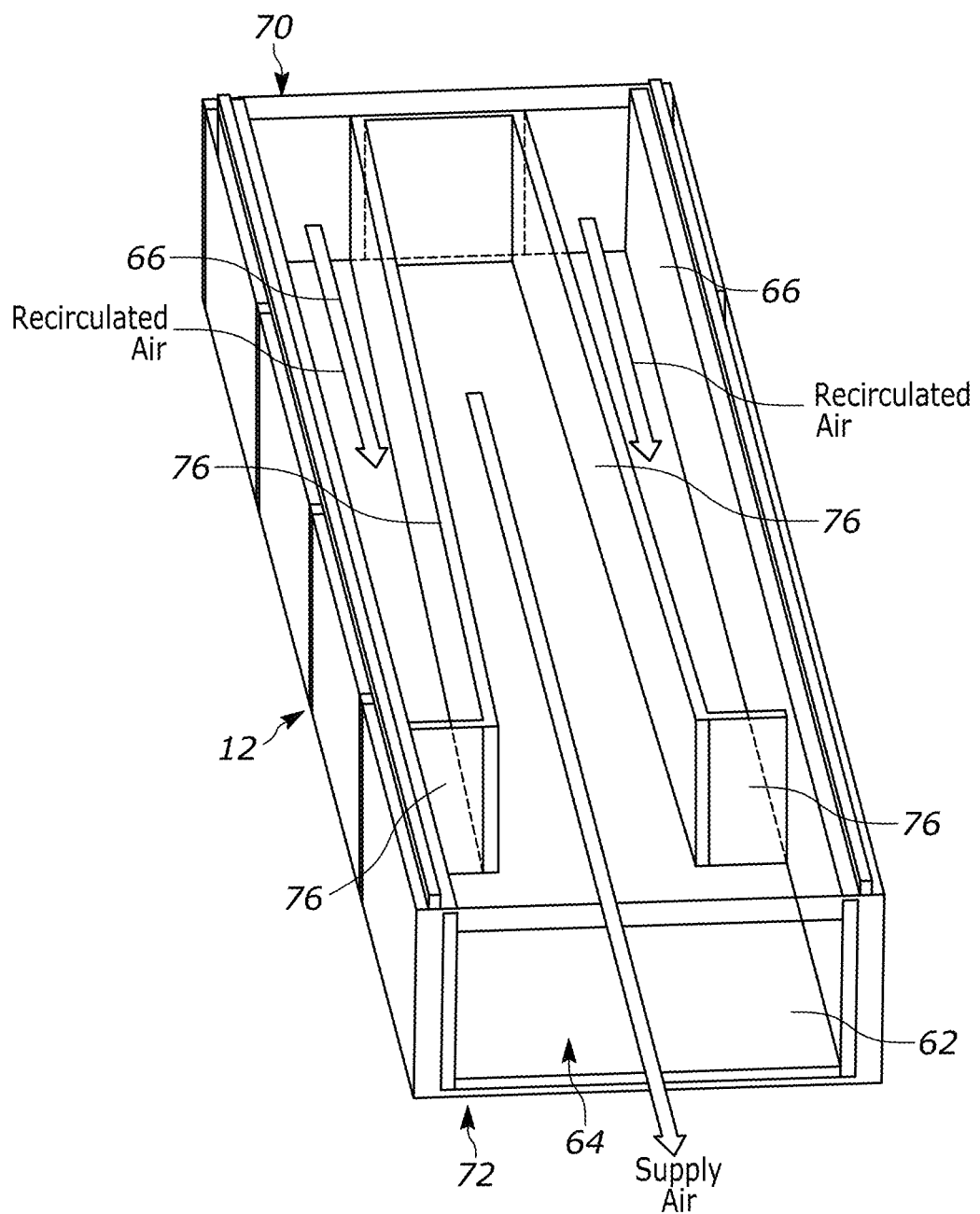
FIG. 13 shows a perspective view of a support duct frame of FIG. 11, in accordance with the present disclosure.

Referring now to FIG. 13, the support duct frame 12 is shown in more detail. In one embodiment, the support duct frame 12 defines or includes an air duct 64 that is divided into a supply air plenum 62 and at least one recirculated air plenum 66. For example, the air duct 64 may be divided or partitioned into a supply air plenum 62 and two recirculated air plena 66 at a return or first end 70, with at least a portion of the supply air plenum 62 being between the two recirculated air plena 66. Further, the recirculated air plena 66 are configured such that they are in fluid communication only with the recirculated air cooling units, and recirculated air drawn from the space being cooled cannot or does not pass into the makeup air cooling unit. As the recirculated air plena 66 are thus in fluid communication with each other, they may be referred to as a single recirculated air plenum 66 for simplicity. However, all cooling units 16 (recirculated air cooling units 16A and makeup air cooling unit 16B) are in fluid communication with the supply air plenum 62 and discharge cooling air into the supply air plenum 62. A first or return end 70 and a second end or supply end 72 of the air duct 64 are open and in fluid communication with at least one supply duct, return duct, or other conduits for delivering air to and/or returning air from a space being cooled. As is shown in FIG. 13, recirculated air (indicated by recirculated air arrows) enters the recirculated air plenum 66, from where it then passes into the recirculated air cooling units 16A, and supply air (indicated by supply air arrows) from all cooling units 16 is passed through the supply air plenum 62 and then into the space being cooled. In some embodiments, each cooling unit 16 is movably and/or rotatably coupled to the support duct frame 12, such as shown and described in FIGS. 1-6.

Referring now to FIGS. 14 and 15, the support duct frame 12, air duct 64, and air flow therethrough is shown in greater detail. FIG. 14 shows the support duct frame 12 and air duct 64 from a return end 70 perspective and FIG. 15 shows the support duct frame 12 and the air duct 64 from a supply end 72 perspective. As discussed above, recirculated air enters the recirculated air plenum 66 from the return end 70 of the air duct 64, from where the recirculated air is drawn into the recirculated air cooling units 16A. Cooling units 16 are not shown in FIGS. 14 and 15 for simplicity, but one example of their relative locations is indicated by the outlets 34 of the cooling units 16. In one embodiment, the upper surface or roof 74 of the air duct 64 is open above the recirculated air plenum 66, which allows recirculated air to flow freely from the recirculated air plenum 66 and into the recirculated air cooling units 16A, such as through louvered or perforated housing 48 of each recirculated air cooling unit 16A. Thus, the housing 48 of each recirculated air cooling unit 16A, and of each makeup air cooling unit 16B, may function as an inlet for the corresponding cooling unit. However, the roof 74 of the air duct 64 is closed above the supply air plenum 62, and the cover 52 of the multi-unit support duct system 50 includes a partition 54 between the first and second compartments 56, 58 (for example, as shown in FIG. 8). In some embodiments, additional partitions or walls 76 coupled to or integrated with the roof 74 of the air duct 64 divide or separate the supply air plenum 62 and the recirculated air plenum 66 from each other so recirculated air cannot enter the supply air plenum 62 until it is exhausted from (passed through the outlet(s) 34 of) the recirculated air cooling unit(s) 16A into the supply air plenum 62. Accordingly, the makeup air cooling unit 16B is fluidly isolated from the recirculated air plenum 66 and from any intake air other than from the surrounding environment. Likewise, the recirculated air cooling units 16A are fluidly isolated from external air from the surrounding environment, or from any intake air other than the recirculated air from the space being cooled. Thus, an upstream source of intake air of the recirculated air cooling units 16A (for example, from the space being cooled) and an upstream source of intake air of the makeup air cooling unit 16B (for example, external air from the surrounding environment) are fluidly isolated from each other. Further, recirculated air within the recirculated air plenum 66, before entering (or upstream of) the recirculated air cooling units 16A, is fluidly isolated from the external air from the surrounding environment draw into the makeup air cooling unit 16B, from the makeup air cooling unit 16B, and from the supply air plenum 62. Recirculated air is mixed with makeup air only when discharged from the recirculated air cooling units 16A into the supply air plenum 62. Additionally, the makeup air cooling unit 16B, and the second compartment 58, is fluidly isolated from the recirculated air plenum 66, and the first compartment 56, in that the makeup air cooling unit 16B does not draw intake air from the recirculated air plenum 66. Thus, the recirculated air cooling units 16A are fluidly isolated from the makeup air cooling unit 16B, as each draws intake air from different sources, before supply air discharged from the recirculated air cooling units 16A and supply air discharged from the makeup air cooling unit 16B are mixed within (or both discharged into) the supply air plenum 62. That is, although the multi-unit support duct system 50 is configured to recirculate air within a space being cooled, an initial upstream source of intake air for the recirculated air cooling unit(s) 16A is different than and fluidly isolated from an initial upstream source of intake air for the makeup air cooling unit(s) 16B.

Continuing to refer to FIGS. 14 and 15, in one non-limiting example meant to illustrate possible temperature and volume contributions of the cooling units, approximately 6000 L/s of recirculated air at approximately 27° C. (±3° C.) is drawn into the recirculated air plenum 66 and then into the recirculated air cooling units 16A. In one embodiment, the recirculated air is cooled by the recirculated air cooling units to approximately 19° C. (±3° C.). As the recirculated air may have a lower temperature than external air (which may be, for example, approximately 38° C. (±3° C.)), the recirculated air cooling units 16A are able to more efficiently cool the volume of air passing therethrough, thus reducing cost, maintenance, required water supply, and component repair and replacement. The makeup air cooling unit 16B draws in a volume of external air from the surrounding environment sufficient to produce approximately 1500 L/s of makeup air, and cools the makeup air to approximately 25° C. (±3° C.). Each of the recirculated air cooling units 16A and the makeup air cooling unit 16B exhausts a volume of exhaust air as the recirculated and makeup air is cooled. For example, as shown in FIG. 12, each cooling unit 16A, 16B may exhaust approximately 500 L/s of exhaust air at approximately 24° C. (±3° C.) into the surrounding environment. With the contribution of the makeup air to the recirculated air, and after exhaust air loss, a total supply air volume of approximately 6000 L/s at approximately 21° C. (±3° C.) may be supplied to the space being cooled. However, it will be understood that the multi-unit support duct system 50, such as the air duct 64 and/or cover 52, may have other suitable configurations that permit at least one cooling unit 16B to draw in external air (and prevent the at least one cooling unit 16B from drawing in recirculated air) and permit at least one cooling unit 16A to draw in recirculated air (and prevent the at least one cooling unit 16A from drawing in external air). Further, in some embodiments, the cover 52 of the multi-unit support duct system 50 and/or the housing 48 of each cooling unit 16A, 16B may be configured such that each cooling unit 16A, 16B draws in external air into one side of the cooling unit housing 48 and draws in recirculated air into one or more other sides of the cooling unit housing 48 (that is, external-air sides of the housing 48 are prevented from drawing in recirculated air and recirculated-air sides of the housing 48 are prevented from drawing in external air).

Of further note, any of the embodiments shown and described herein may include additional components to enhance cooling capacity, facilitate operation, and/or reduce maintenance. For example, as shown in FIG. 8, the cover 52 may be composed of a plurality of panels 78 coupled to a frame 80 to define the first and second compartments 56, 58. One or more panels 78 may be removable for easy access to the cooling units 16A, 16B within the cover 52, and additional panels 78 may be coupled to the frame 80 to at least partially define or enclose the air duct 64. As the first compartment 56, the second compartment 58, and the air duct 64 are each at least partially located with or defined by the cover 52 (such as panels 78, partition 54, and/or frame 80, the multi-unit cooling system 50 is referred to herein as including an enclosed support duct frame. As a further example, the cover 52 may include at least one panel 78 defining a roof or upper surface of the cover 52, and these panels 78 may include or define the exhaust outlet 68 aligned with each of the cooling units 16. Each panel 78 defining an exhaust outlet 68 may include one or more handles 82 for removing the panel 78, a lid 84, and/or other components. Likewise, other panels 78, including panels defining the air duct 64 and the partition 54, may also include insulation to prevent or reduce heat exchange between at least the cooled supply air within the supply air plenum 62 and the surrounding environment. As a further example, the multi-unit support duct system 10, 50 includes a fluid conduit 42 connected to each of the cooling units 16 for draining coolant (for example, water) from the cooling units 16.

Embodiments

Some embodiments advantageously provide multi-unit cooling systems and structures thereof for residential, commercial, or other buildings. In one embodiment, a support duct system comprises: a support duct frame including a longitudinal axis and at least one mounting bracket support, each of the at least one mounting bracket support being movable relative to the longitudinal axis of the support duct frame; and at least one mounting bracket coupled to a corresponding one of the at least one mounting bracket support, each of the at least one mounting bracket being removably couplable to a corresponding cooling unit.

In one aspect of the embodiment, the support duct system further comprises at least one longitudinal frame member extending at least substantially parallel to the longitudinal axis of the support duct frame, the at least one mounting bracket support being slidably coupled to the at least one longitudinal frame member.

In one aspect of the embodiment, the at least one longitudinal frame member includes two longitudinal frame members, the at least one mounting bracket support extending between the longitudinal frame members.

In one aspect of the embodiment, the support duct system further comprises an air duct within the support duct frame.

In one aspect of the embodiment, the air duct includes at least one cooling unit inlet.

In one aspect of the embodiment, the support duct system further comprises a service component conduit.

In one aspect of the embodiment, the support duct system further comprises a control box in communication with the at least one service component conduit.

In one aspect of the embodiment, the support duct frame is a first support duct frame, the support duct system further comprising a second support duct frame.

In one aspect of the embodiment, the service component conduit is a first service component conduit of the first support duct frame, the support duct system further comprising a second service component conduit of the second support duct frame, the first service component conduit being in communication with the second service component conduit.

In one aspect of the embodiment, the support duct system further comprises a plurality of adjustable feet coupled to the support duct frame.

In one embodiment, a multi-unit support duct system comprises: a support duct frame including a longitudinal axis and a plurality of mounting bracket supports, each of the plurality of mounting bracket supports being movable relative to the longitudinal axis of the support duct frame; a plurality of mounting brackets, each of the plurality of mounting brackets being coupled to a corresponding one of the plurality of mounting bracket supports; a plurality of cooling units, each of the plurality of cooling units being removably couplable to a corresponding one of the plurality of mounting brackets; and an air duct within the support duct frame and extending along the longitudinal axis of the support duct frame, an upstream source of intake air of a first at least one of the plurality of cooling units being fluidly isolated from an upstream source of intake air of a second at least one of the plurality of cooling units.

In one aspect of the embodiment, the multi-unit support duct system further comprises a first longitudinal frame member and a second longitudinal frame member, each of the first and second longitudinal frame members extending at least substantially parallel to the longitudinal axis of the support duct frame, each of the plurality of mounting bracket supports extending between the first and second longitudinal frame members.

In one aspect of the embodiment, the air duct includes: a recirculated air plenum, the recirculated air plenum being in fluid communication with the first at least one of the plurality of cooling units; and a supply air plenum, the supply air plenum being in fluid communication with the first at least one of the plurality of cooing units and the second at least one of the plurality of cooling units.

In one aspect of the embodiment, the second at least one of the plurality of cooling units is in fluid communication with external air from a surrounding environment as an upstream source and the first at least one of the plurality of cooling units is fluidly isolated from the external air from the surrounding environment as the upstream source.

In one aspect of the embodiment, the multi-unit support duct system further comprises a plurality of adjustable feet coupled to the support duct frame.

In one aspect of the embodiment, each of the plurality of cooling units is coupled to the corresponding one of the plurality of mounting brackets such that each of the plurality of cooling units is independently rotatable relative to the support duct frame.

In one embodiment, a method of installing a multi-unit support duct system comprises: installing a support duct frame at an installation location, the support duct frame including a longitudinal axis and the multi-unit support duct system including a plurality of cooling units rotatably coupled to the support duct frame, each of the plurality of cooling units being in a first configuration relative to the longitudinal axis of the support duct frame; and independently rotating each of the plurality of cooling units from the first configuration to a second configuration relative to the support duct frame.

In one aspect of the embodiment, each of the plurality of cooling units has a longitudinal axis and: the longitudinal axis of each of the plurality of cooling units is at least substantially parallel to the longitudinal axis of the support duct frame when the plurality of cooling units is in the first configuration relative to the support duct frame; and the longitudinal axis of each of the plurality of cooling units is offset from the longitudinal axis of the support duct frame when the plurality of cooling units is in the second configuration relative to the support duct frame.

In one aspect of the embodiment, the longitudinal axis of each of the plurality of cooling units is approximately 45° from the longitudinal axis of the support duct frame.

In one aspect of the embodiment, the method further comprises adjusting a length of each of a plurality of adjustable feet to level the support duct frame relative to the installation location, each of the plurality of adjustable feet including a first end coupled to the support duct frame and a second free end configured to contact a surface of the installation location.

In one embodiment, a multi-unit cooling system comprises: an enclosed support duct frame defining a first compartment and a second compartment, the first compartment and the second compartment being fluidly isolated from each other; at least one recirculated air cooling unit within the first compartment; and at least one makeup air cooling unit within the second compartment. In one aspect of the embodiment, the enclosed support duct frame further defines an air duct, the air duct being in fluid communication with the at least one recirculated air cooling unit and the at least one makeup air cooling unit.

In one aspect of the embodiment, the air duct is below the first compartment and the second compartment.

In one aspect of the embodiment, the air duct includes: a supply air plenum in fluid communication with the at least one recirculated air cooling unit and the at least one makeup air cooling unit; and a recirculated air plenum in fluid communication with the at least one recirculated air cooling unit, the supply air plenum and the recirculated air plenum being divided such that the at least one makeup air cooling unit is fluidly isolated from the recirculated air plenum.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A multi-unit cooling system, comprising:
   an enclosed support duct frame defining a first compartment and a second compartment, the first compartment and the second compartment being fluidly isolated from each other;
   at least one recirculated air cooling unit within the first compartment;
   at least one makeup air cooling unit within the second compartment;
   an air duct in fluid communication with the at least one recirculated air cooling unit and the at least one makeup air cooling unit;
   a supply air plenum;
   a recirculated air plenum; and
   at least one wall, the at least one wall separating the supply air plenum and the recirculated air plenum.

2. The multi-unit cooling system of claim 1, wherein the air duct is subjacent to the first compartment and the second compartment.

3. The multi-unit cooling system of claim 1, wherein the air duct is at least partially defined by the enclosed support duct frame.

4. The multi-unit cooling system of claim 1, wherein the enclosed support duct frame includes a longitudinal axis, a plurality of mounting bracket supports being movable relative to the longitudinal axis of the enclosed support duct frame, and a plurality of mounting brackets coupled to the plurality of mounting bracket supports, each of the at least one recirculated air cooling unit and each of the at least one makeup air cooling unit being coupled to a corresponding one of the plurality of mounting brackets such that each of the at least one recirculated air cooling unit and each of the at least one makeup air cooling unit is independently rotatable relative to the enclosed support duct frame and about an axis that is at least substantially orthogonal to the longitudinal axis of the enclosed support duct frame.

5. The multi-unit cooling system of claim 1, wherein the at least one recirculated air cooling unit includes at least two recirculated air cooling units and the at least one makeup air cooling unit includes one makeup air cooling unit.

6. The multi-unit cooling system of claim 1, wherein the enclosed support duct frame includes:
   a frame; and
   a plurality of panels coupled to the frame and at least one partition, the plurality of panels and the at least one partition defining the first compartment and the second compartment.

7. The multi-unit cooling system of claim 1, wherein:
   each of the at least one makeup air cooling unit includes an outlet, the outlet of each of the at least one makeup air cooling unit being in fluid communication with the supply air plenum; and
   each of the at least one recirculated air cooling unit having an outlet, the outlet of each of the at least one recirculated air cooling unit being in fluid communication with supply air plenum.

8. The multi-unit cooling system of claim 7, wherein:
   each of the at least one makeup air cooling unit includes an inlet, the inlet of each of the at least one makeup air cooling unit being in fluid communication with external air from a surrounding environment as a source of makeup intake air; and
   each of the at least one recirculated air cooling unit includes an inlet, the inlet of each of the at least one recirculated air cooling unit being fluidly isolated from the external air from the surrounding environment as the source of makeup intake air and being in fluid communication with the recirculated air plenum as a source of recirculated intake air.

* * * * *